United States Patent
Fukui et al.

(10) Patent No.: US 9,413,010 B2
(45) Date of Patent: Aug. 9, 2016

(54) LITHIUM SECONDARY BATTERY AND METHOD FOR MANUFACTURING THE SAME

(75) Inventors: Atsushi Fukui, Kobe (JP); Taizo Sunano, Kobe (JP); Maruo Kamino, Katano (JP)

(73) Assignee: SANYO Electric Co., Ltd., Osaka (JP)

( * ) Notice: Subject to any disclaimer, the term of this patent is extended or adjusted under 35 U.S.C. 154(b) by 653 days.

(21) Appl. No.: 13/636,811

(22) PCT Filed: Mar. 24, 2011

(86) PCT No.: PCT/JP2011/057213
§ 371 (c)(1),
(2), (4) Date: Oct. 3, 2012

(87) PCT Pub. No.: WO2011/118720
PCT Pub. Date: Sep. 29, 2011

(65) Prior Publication Data
US 2013/0101897 A1    Apr. 25, 2013

(30) Foreign Application Priority Data

Mar. 26, 2010 (JP) .................................. 2010-72908

(51) Int. Cl.
*H01M 4/62* (2006.01)
*H01M 4/04* (2006.01)
(Continued)

(52) U.S. Cl.
CPC .......... *H01M 4/622* (2013.01); *C08G 73/1067* (2013.01); *C08G 73/1082* (2013.01);
(Continued)

(58) Field of Classification Search
CPC ..................................................... H01M 4/622
See application file for complete search history.

(56) References Cited

U.S. PATENT DOCUMENTS 3,483,144 A * 12/1969 Serlin et al. ............... 279/51
2004/0043294 A1    3/2004 Fukui et al.
(Continued)

FOREIGN PATENT DOCUMENTS

JP    3-59034 A    3/1991
JP    4-261430 A    9/1992
(Continued)

OTHER PUBLICATIONS

JP 07247357 Abstract).*
(Continued)

*Primary Examiner* — Patrick Ryan
*Assistant Examiner* — Alex Usyatinsky
(74) *Attorney, Agent, or Firm* — Westerman, Hattori, Daniels & Adrian, LLP

(57) ABSTRACT

Provided is a lithium secondary battery in which negative-electrode active material particles containing silicon and/or a silicon alloy are used and which prevents the occurrence of breakage of a binder itself and peel-off of the binder at the interfaces with the negative-electrode active material and the negative-electrode current collector and has a high energy density and an excellent cycle characteristic. The lithium secondary battery includes: a negative electrode in which a negative-electrode active material layer including negative-electrode active material particles containing silicon and/or a silicon alloy and a binder is formed on a surface of electrically conductive metal foil serving as a negative-electrode current collector; a positive electrode; and a nonaqueous electrolyte, wherein the binder contains a polyimide resin including a crosslinked structure formed by imidization of a hexavalent or higher-valent carboxylic acid or an anhydride thereof with a diamine.

8 Claims, 1 Drawing Sheet

(51) Int. Cl.
*H01M 4/134* (2010.01)
*H01M 4/1395* (2010.01)
*H01M 10/052* (2010.01)
*C08L 79/08* (2006.01)
*C08G 73/10* (2006.01)

(52) U.S. Cl.
CPC .................. *C08L 79/08* (2013.01); *H01M 4/04* (2013.01); *H01M 4/0404* (2013.01); *H01M 4/134* (2013.01); *H01M 4/1395* (2013.01); *H01M 10/052* (2013.01); *Y02E 60/122* (2013.01); *Y02P 70/54* (2015.11); *Y10T 29/49115* (2015.01)

(56) References Cited

U.S. PATENT DOCUMENTS

| | | | |
|---|---|---|---|
| 2005/0244711 A1 | 11/2005 | Fukui et al. | |
| 2006/0003226 A1 | 1/2006 | Sawa et al. | |
| 2008/0124631 A1 | 5/2008 | Fukui et al. | |
| 2009/0246632 A1 | 10/2009 | Fukui et al. | |
| 2011/0193016 A1* | 8/2011 | Hirano | C08G 73/1042 252/182.1 |

FOREIGN PATENT DOCUMENTS

| | | | |
|---|---|---|---|
| JP | 6-53208 | A | 2/1994 |
| JP | 07247357 | * | 9/1995 |
| JP | 9-45332 | A | 2/1997 |
| JP | 10-302771 | A | 11/1998 |
| JP | 2002-260637 | A | 9/2002 |
| JP | 2007-242405 | A | 9/2007 |
| JP | 2008-34352 | A | 2/2008 |
| WO | 2004/004031 | A1 | 1/2004 |

OTHER PUBLICATIONS

Polymer (Korea) (1980), 4(4), 321-30 (CAS Abstract).*
Shim Jae-Hu et al. Materials Science Monographs (1984), 21(Inter-relat. Process., Struct., Prop. Polym. Mater.), 61-8. (Abstract).*
International Search Report of PCT/JP2011/057213, date of mailing May 31, 2011 (copy submitted on Sep. 24, 2012).
Shim, J.H. et al., "Studies on Preparation and Thermostability of Polyimides", The Polymer Society of Korean, vol. 4, No. 4, May 12, 1980, pp. 321-330, with English Abstract, Cited in CN Office Action dated May 23, 2014 (10 pages).
Office Action dated May 23, 2014, issued in corresponding Chinese Patent Application No. 201110080987.9, with English Translation of Search Report (12 pages).
Extended European Search Report dated Jul. 9, 2013, issued in corresponding European Patent Application No. 11759525.6.

* cited by examiner

LITHIUM SECONDARY BATTERY AND METHOD FOR MANUFACTURING THE SAME

TECHNICAL FIELD

This invention relates to lithium secondary batteries in which negative-electrode active material particles containing silicon and/or a silicon alloy are used as a negative-electrode active material.

BACKGROUND ART

Recently, for the purpose of giving a lithium secondary battery a higher energy density, alloying materials of Al, Sn, Si, and like elements having a high capacity per volume due to an alloying reaction with lithium are being taken up, instead of a graphite material in practical use, as candidates for a novel negative-electrode active material and much studied.

However, in a negative electrode in which a material capable of alloying with lithium is used as an active material, the active material undergoes large volume changes during lithium storage and release, which presents a problem in that the active material may be finely divided or shed off from a current collector to degrade the current collecting performance in the electrode, resulting in a poor charge-discharge cycle characteristic.

In relation to the above problem, it has been found that if, in order to achieve high current collecting performance in a negative electrode, an active material layer containing an active material made of a silicon-containing material and a polyimide binder is disposed by sintering it in a non-oxidizing atmosphere, the resultant negative electrode will exhibit a good charge-discharge cycle characteristic (see Patent Literature 1 below).

Furthermore, it has also been found that by changing the kind of polyimide serving as a negative electrode binder, the cycle characteristic can be further improved (see Patent Literatures 2 and 3 below). Patent Literature 4 discloses that the use of a polyimide composed of 3,3',4,4'-benzophenonetetracarboxylic dianhydride and either m-phenylenediamine or 4,4'-diaminodiphenylmethane enables the cycle characteristic to be improved (see Patent Literature 4 below).

CITATION LIST

Patent Literature

Patent Literature 1: JP-A 2002-260637
Patent Literature 2: WO 04/004031
Patent Literature 3: JP-A 2007-242405
Patent Literature 4: JP-A 2008-34352

SUMMARY OF INVENTION

Technical Problem

However, in any of the above conventional techniques, the adhesion of the binder to negative electrode members is unsatisfactory, resulting in an unsatisfactory cycle characteristic.

An object of the present invention is to provide a lithium secondary battery in which negative-electrode active material particles containing silicon and/or a silicon alloy are used as a negative-electrode active material and which prevents the occurrence of breakage of a binder itself and peel-off of the binder at the interfaces with the negative-electrode active material and the negative-electrode current collector and exhibits an excellent cycle characteristic and a manufacturing method of the lithium secondary battery.

Solution to Problem

The present invention is directed to a lithium secondary battery including: a negative electrode in which a negative-electrode active material layer including negative-electrode active material particles containing silicon and/or a silicon alloy and a binder is formed on a surface of a negative-electrode current collector; a positive electrode; and a non-aqueous electrolyte, wherein the binder contains a polyimide resin including a crosslinked structure formed by imidization of a hexavalent or higher-valent carboxylic acid or an anhydride thereof with a diamine.

In the present invention, the binder contains a polyimide resin including a crosslinked structure formed by imidization of a hexavalent or higher-valent carboxylic acid or an anhydride thereof with a diamine. Since the polyimide resin includes such a crosslinked structure, it can increase the mechanical strength of the binder as compared with a polyimide resin including no crosslinked structure and formed only of a linear chain structure. Therefore, when silicon negative-electrode active material particles cause volume changes during charge and discharge, the breakage of the binder itself can be prevented to retain the current collecting structure in the negative electrode, resulting in providing an excellent charge-discharge cycle characteristic.

In addition, the polyimide resin has many imide bonds in the crosslinked structure and, therefore, can develop high adhesion. Because the imide bond has a high polarity, it exhibits high adhesion to silicon active material particles and metal foil serving as a current collector, such as copper foil. Furthermore, the crosslinked structure has a branched structure extending in many directions and, therefore, the imide bonds existing in the crosslinked structure also extend in many directions. Thus, many imide bonds with high polarity will come into contact with asperities on the surfaces of the active material particles and asperities on the surfaces of the current collector, so that the whole polyimide resin can develop high adhesion to the active material particles and the current collector.

In a preferred embodiment of the present invention, the anhydride of the hexavalent or higher-valent carboxylic acid comprises an anhydride represented by Chem. 1 below, the diamine comprises a diamine represented by Chem. 2 below, and the crosslinked structure comprises a structure represented by Chem. 3 below.

[Chem. 1]

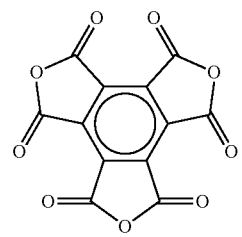

[Chem. 2]

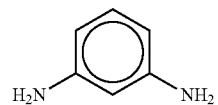

-continued

[Chem. 3]

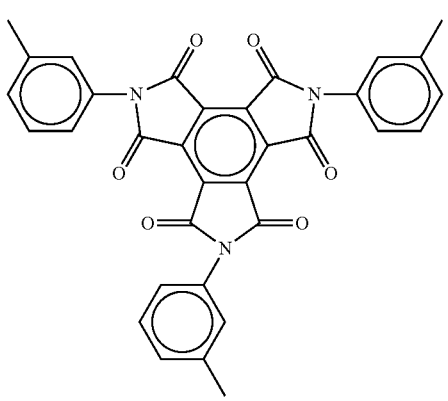

In a preferred embodiment of the present invention, the polyimide resin including the crosslinked structure also includes a linear chain structure formed by imidization of a tetracarboxylic acid or a dianhydride thereof with a diamine.

In a preferred embodiment of the present invention, the polyimide resin including the crosslinked structure includes a linear chain structure represented by Chem. 6 below and/or Chem. 7 below and formed by imidization of a tetracarboxylic dianhydride represented by Chem. 4 below and/or Chem. 5 below with the diamine represented by Chem. 2.

[Chem. 4]

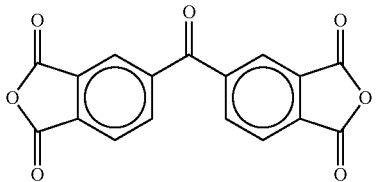

[Chem. 5]

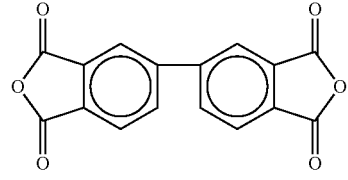

[Chem. 6]

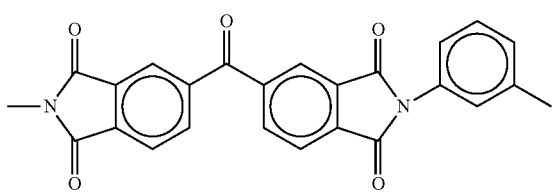

[Chem. 7]

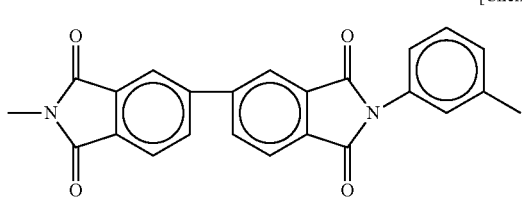

Furthermore, in the polyimide resin including the crosslinked structure and the linear chain structure, the ratio between the total amount of substance of the crosslinked structure and the total amount of substance of the linear chain structure (crosslinked structure to linear chain structure) is preferably 5:95 to 15:85. Within the above range, the polyimide resin can strike a balance between high mechanical strength due to the crosslinked structure and deformability (flexibility) due to the linear chain structure to provide a binder excellent in strength and adhesion.

In the present invention, the polyimide resin may further include a crosslinked structure formed by imidization of a trivalent or higher-valent amine.

A manufacturing method of the present invention is a method capable of manufacturing the negative electrode for the lithium secondary battery of the present invention and includes the steps of: forming an esterified product by reacting a hexavalent or higher-valent carboxylic anhydride with a monovalent alcohol in a solvent; preparing a binder precursor solution containing monomer components for a polyimide resin including a crosslinked structure by adding a diamine to the esterified product; preparing a negative-electrode mixture slurry by dispersing negative-electrode active material particles containing silicon and/or a silicon alloy into the binder precursor solution; applying the negative-electrode mixture slurry onto a surface of electrically conductive metal foil serving as a negative-electrode current collector; and forming a binder of the polyimide resin including the crosslinked structure to produce a negative electrode by subjecting the negative-electrode current collector having the negative-electrode mixture slurry applied thereto to a heat treatment in a non-oxidizing atmosphere and thereby causing a polymerization reaction and an imidization reaction between the monomer components for the polyimide resin including the crosslinked structure.

In the manufacturing method of the present invention, the step of preparing a binder precursor solution preferably includes the step of reacting a hexavalent or higher-valent carboxylic anhydride and a tetracarboxylic dianhydride with a monovalent alcohol to form their respective esterified products and adding a diamine to the esterified products to prepare a binder precursor solution containing monomer components for a polyimide resin including a crosslinked structure and a linear chain structure.

A method for manufacturing a lithium secondary battery of the present invention includes the steps of: producing a negative electrode based on the above manufacturing method of the present invention; producing an electrode assembly by disposing a separator between the negative electrode and a positive electrode; and impregnating the electrode assembly with a nonaqueous electrolyte.

Advantageous Effects of Invention

In the present invention, since the binder for forming the negative-electrode active material layer contains a polyimide resin including a crosslinked structure, the binder itself can be increased in mechanical strength and adhesion. Therefore, even when negative-electrode active material particles containing silicon and/or a silicon alloy cause volume changes during charge and discharge, the occurrence of breakage of the binder itself and peel-off of the binder at the interfaces with the negative-electrode active material and the negative-electrode current collector can be prevented to prevent degradation in electronic conductivity inside the negative electrode. Therefore, the resultant battery can exhibit an excellent cycle characteristic.

DESCRIPTION OF EMBODIMENTS

Figure 1:
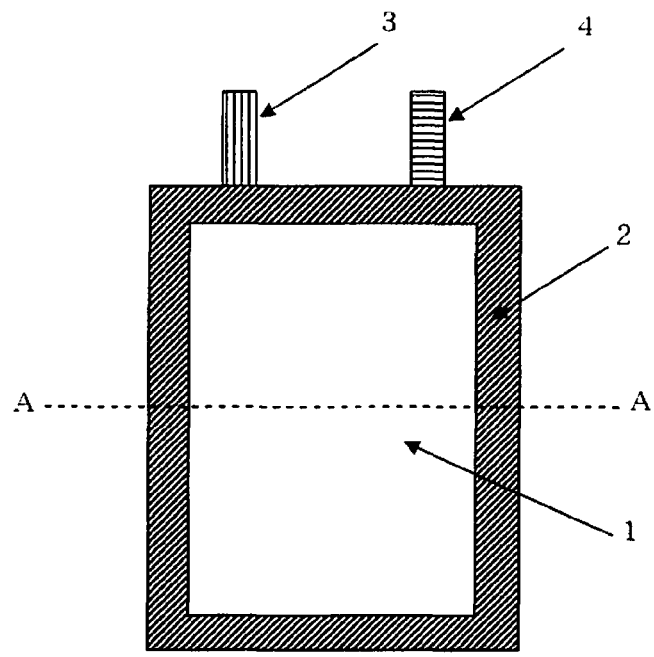
FIG. 1 is a plan view showing a lithium secondary battery produced in an example of the present invention.

Hereinafter, the present invention will be described in more detail.

Examples of the hexavalent or higher-valent carboxylic acid or its anhydride include benzenehexacarboxylic acid (mellitic acid), its anhydride, i.e., benzenehexacarboxylic trianhydride (mellitic anhydride), and 1,2,3,4,5,6-cyclohexanehexacarboxylic acid.

Preferred among them is benzene hexacarboxylic trianhydride represented by Chem. 1. Benzene hexacarboxylic trianhydride forms a crosslinked structure following imidization with a diamine. This crosslinked structure is a structure in which three imide groups are located evenly in three directions in an aromatic ring and planar surfaces of respective three five-membered rings formed at the three imide groups are aligned in the same plane with the planar surface of the aromatic ring and is, therefore, a structure having high symmetry and high structural stability. Since this crosslinked structure is included in the polyimide resin, the whole resin will develop higher mechanical strength.

Examples of the diamine include aromatic diamines, such as m-phenylenediamine, p-phenylenediamine, 3,3'-diaminobenzophenone, 4,4'-diaminobiphenyl, 4,4'-diaminodiphenylsulfone, 4,4'-diaminophenylether, 4,4'-diaminophenylmethane, 2,2-bis[4 (4-aminophenoxy)phenyl]propane, 1,4-bis(3-aminophenoxy)benzene, and 1,4-bis(4-aminophenoxy)benzene.

Most preferred among them is m-phenylenediamine represented by Chem. 2 above, in light of the balance between the mechanical strength and deformability (flexibility) of a polyimide resin including a crosslinked structure formed by imidization with a polycarboxylic acid. m-phenylene diamine contains a single aromatic ring, wherein two amine groups are located in the meta position in this aromatic ring. Thus, high mechanical strength due to the aromatic ring and flexibility due to the location of the amine groups in the meta position can achieve a polyimide resin striking a balance between mechanical strength and deformability (flexibility).

On the other hand, in a polyimide resin produced using p-phenylenediamine, p-phenylenediamine has a structure in which two amine groups are located in the para position in an aromatic ring and, therefore, has a lower flexibility than m-phenylenediamine having two amine groups in the meta position. Therefore, the produced polyimide resin tends to reduce the deformability (flexibility) and the adhesion.

Furthermore, 3,3'-diaminobenzophenone, 4,4'-diaminobiphenyl, 4,4'-diaminodiphenylsulfone, 4,4'-diaminophenylether, 4,4'-diaminophenylmethane, 2,2-bis[4(4-aminophenoxy)phenyl]propane, 1,4-bis(3-aminophenoxy)benzene, and 1,4-bis(4-aminophenoxy)benzene have two or more aromatic rings and, therefore, have excessively high deformability (flexibility) as compared with m-phenylenediamine having a single aromatic ring, so that the resultant resin tends to reduce the mechanical strength.

Hence, in the present invention, the most preferred crosslinked structure formed by imidization of a hexavalent or higher-valent carboxylic acid or its anhydride with a diamine is one in which benzenehexacarboxylic acid (mellitic acid) or its anhydride, i.e., benzenehexacarboxylic trianhydride (mellitic anhydride) represented by Chem. 1 above is used as the hexavalent or higher-valent carboxylic acid or its anhydride and m-phenylenediamine represented by Chem. 2 above is used as the diamine and, therefore, the most preferred crosslinked structure is one formed by imidization of the above compounds and represented by Chem. 3 above.

The polyimide resin including the crosslinked structure, which serves as a negative electrode binder in a lithium secondary battery of the present invention, preferably also includes a linear chain structure formed by imidization of a tetracarboxylic acid or an anhydride thereof with a diamine.

As compared with the crosslinked structure formed by imidization of a hexavalent or higher-valent carboxylic acid or an anhydride thereof with an diamine, the linear chain structure formed by imidization of a tetracarboxylic acid or an anhydride thereof with a diamine has higher deformability (flexibility) and more excellent adhesion. Therefore, the existence of not only the crosslinked structure but also the linear chain structure in the polyimide resin enables, with high mechanical strength due to the crosslinked structure developed, the development of deformability (flexibility) due to the linear chain structure to provide a binder excellent in strength and adhesion.

In the present invention, examples of the tetracarboxylic dianhydride include aromatic tetracarboxylic dianhydrides, such as 1,2,4,5-benzenetetracarboxylic 1,2:4,5-dianhydride (also known as pyromellitic dianhydride), 3,3',4,4'-benzophenonetetracarboxylic dianhydride, 3,3',4,4'-biphenyltetracarboxylic dianhydride, 3,3',4,4'-diphenylsulfonetetracarboxylic dianhydride, 3,3',4,4'-diphenylethertetracarboxylic dianhydride, and 3,3',4,4'-diphenylmethanetetracarboxylic dianhydride.

Preferred among them are 3,3',4,4'-benzophenonetetracarboxylic dianhydride and 3,3',4,4'-biphenyltetracarboxylic dianhydride in light of the balance between the mechanical strength and the formability (flexibility) in the form of a linear chain structure formed by imidization with a diamine, and particularly preferred is 3,3',4,4'-benzophenonetetracarboxylic dianhydride as seen from Examples to be described later. Both of 3,3',4,4'-benzophenonetetracarboxylic dianhydride and 3,3',4,4'-biphenyltetracarboxylic dianhydride have two aromatic rings, wherein the two aromatic rings always retain the planarity by an effect of the bond located between the two aromatic rings. Thus, a polyimide resin can be obtained which strikes a balance between mechanical strength and deformability (flexibility).

On the other hand, a polyimide resin produced using 1,2,4,5-benzenetetracarboxylic 1,2:4,5-dianhydride tends to have higher rigidity, lower deformability (flexibility), and lower adhesion than the polyimide resin obtained from a tetracarboxylic dianhydride having two aromatic rings, such as 3,3',4,4'-benzophenonetetracarboxylic dianhydride or 3,3',4,4'-biphenyltetracarboxylic dianhydride.

Furthermore, unlike 3,3',4,4'-benzophenonetetracarboxylic dianhydride and 3,3',4,4'-biphenyltetracarboxylic dianhydride, 3,3',4,4'-diphenylsulfonetetracarboxylic dianhydride, 3,3',4,4'-diphenylethertetracarboxylic dianhydride, and 3,3',4,4'-diphenylmethanetetracarboxylic dianhydride do not assume a form in which two aromatic rings always retain the planarity, owing to an effect of the bond located between the two aromatic rings, so that the resultant resin tends to reduce the mechanical strength.

Hence, in the present invention, the most preferred linear chain structures formed by imidization of a tetracarboxylic acid or its anhydride with a diamine are those in which 3,3',4,4'-benzophenonetetracarboxylic dianhydride represented by Chem. 4 above and/or 3,3',4,4'-biphenyltetracarboxylic dianhydride represented by Chem. 5 above is used as the tetracarboxylic acid and m-phenylenediamine represented by Chem. 2 above is used as the diamine and, therefore, the most preferred linear chain structures are those formed by imidization of the above compounds and represented by Chem. 6 and Chem. 7 above.

The polyimide resin in the present invention may also include a crosslinked structure containing an imide group formed by a trivalent or higher-valent amine, besides an imide group formed by a diamine. The crosslinked structure containing an imide group formed by a trivalent or higher-valent amine is formed by imidization of the trivalent or higher-valent amine and a hexavalent or higher-valent carboxylic acid or a tetracarboxylic acid. Since not only the crosslinked structure formed by imidization of a polycarboxylic acid and a diamine but also the crosslinked structure containing an imide group formed by a trivalent or higher-valent amine are formed in the polyimide resin, the mechanical strength of the whole polyimide resin can be further increased.

Trivalent or higher-valent amines that can be used include trivalent to hexavalent amines, but trivalent amines, or triamines, are particularly preferably used. With the use of a trivalent to hexavalent amine, a polyimide resin can be obtained in which the mechanical strength is sufficiently ensured. However, the use of a tetravalent or higher-valent amine will increase the mechanical strength of the polyimide resin but make the polyimide resin brittle because of decrease in the deformability (flexibility) of the crosslinked structure, resulting in easier breakage of the polyimide resin during charge and discharge. In addition, if the deformability (flexibility) of the resin is low, the adhesion is also reduced. Therefore, in light of the balance between mechanical strength and deformability (flexibility), trivalent amines, or triamines, are particularly preferred.

Examples of the triamines include aromatic triamines, such as tris(4-aminophenyl)methanol (also known as pararosaniline), tris(4-aminophenyl)methane, 3,4,4'-triaminodiphenyl ether, 3,4,4'-triaminobenzophenone, 3,4,4-triaminodiphenylmethane, 1,4,5-triaminonaphthalene, tris(4-aminophenyl)amine, 1,2,4-triaminobenzene, and 1,3,5-triaminobenzene, 2,4,6-triamino-1,3,5-triazine (also known as melamine), and 1,3,5-triamino cyclohexane.

Preferred among them are tris(4-aminophenyl)methanol, tris(4-aminophenyl)methane, tris(4-aminophenyl)amine, 1,3,5-triaminobenzene, 2,4,6-triamino-1,3,5-triazine, and 1,3,5-triaminocyclohexane. In these triamines, the location of amine groups in the molecule has high symmetry, so that the crosslinked structure formed by imidization with a polycarboxylic acid or a tetracarboxylic dianhydride has high symmetry and high structural stability, which enables the whole resin to develop higher mechanical strength.

From the viewpoint of thermal resistance in addition to the above viewpoint of mechanical strength, preferred are aromatic triamines, such as tris(4-aminophenyl)methanol, tris(4-aminophenyl)methane, tris(4-aminophenyl)amine, and 1,3,5-triaminobenzene. Imidization of such a multivalent amine and a tetracarboxylic dianhydride involves heat treatment. However, if the thermal resistance of these materials themselves is low, they will be thermally decomposed during heat treatment, resulting in failure in the formation of a desired polyimide resin.

On the other hand, examples of triamines commercially available at relatively low cost include tris(4-aminophenyl)methanol, 3,4,4'-triaminodiphenyl ether, and 1,2,4-triaminobenzene.

Therefore, from all the viewpoints of cost, mechanical strength, and thermal resistance, tris(4-aminophenyl)methanol is most preferred.

Examples of the tetraamine include tetrakis(4-aminophenyl)methane, 3,3',4,4'-tetraminodiphenyl ether, 3,3',4,4'-tetraminobenzophenone, 3,3',4,4'-tetraminodiphenylmethane, and N,N,N',N'-tetrakis(4-methylphenyl)benzidine.

In using such a multivalent amine, the mole ratio between diamine and multivalent amine (diamine to multivalent amine) is preferably within the range of 90:10 to 70:30.

In the manufacturing method of the present invention, a lithium secondary battery can be produced which contains a negative electrode binder containing a polyimide resin including a crosslinked structure formed by imidization of a hexavalent or higher-valent carboxylic anhydride with an diamine.

A binder precursor solution used is a solution containing an esterified product of a hexavalent or higher-valent carboxylic anhydride with a monovalent alcohol and a diamine, i.e., a monomer component mixture for a polyimide resin including a crosslinked structure, and the binder precursor solution is subjected to a heat treatment to appropriately cause a polymerization reaction and a subsequent imidization reaction. Thus, a polyimide resin including a crosslinked structure can be formed.

In addition, since a monomer component mixture for a polyimide resin including a crosslinked structure is thus used as a binder precursor, the binder precursor has a lower viscosity than those in polymer form, such as polyamide acids which are typical as precursors to polyimide resins. Therefore, the binder precursor is likely to enter between asperities on the surfaces of the negative-electrode active material particles during preparation of the negative-electrode mixture slurry and also likely to enter between asperities on the surfaces of the negative-electrode current collector during application of the negative-electrode mixture slurry onto the negative-electrode current collector. Thus, the anchoring effect between the negative-electrode active material particles and the binder and the anchoring effect between the negative-electrode current collector and the binder are largely developed, so that the binder can achieve higher adhesion.

Hexavalent or higher-valent carboxylic anhydrides and diamines that can be used for the binder precursor in this case are those exemplified previously herein.

The esterified product of a hexavalent or higher-valent carboxylic anhydride with an alcohol can be obtained by reacting a hexavalent or higher-valent carboxylic anhydride with an alcoholic compound having a single hydroxy group, such as methanol, ethanol, isopropanol, butanol or like aliphatic alcohol.

In the method for manufacturing a lithium secondary battery of the present invention, the binder precursor solution preferably contains a tetracarboxylic dianhydride. The binder precursor solution contains not only a hexavalent or higher-valent carboxylic anhydride and a diamine but also a tetracarboxylic dianhydride. When the negative-electrode current collector to which the negative-electrode mixture slurry is applied is subjected to a heat treatment in a non-oxidizing atmosphere, not only a crosslinked structure formed by a polymerization reaction of the hexavalent or higher-valent carboxylic anhydride and the diamine and a subsequent imidization reaction of them is provided but also a linear chain structure formed by a polymerization reaction of the tetracarboxylic dianhydride and the diamine and a subsequent imidization reaction of them is provided. Furthermore, these compounds uniformly exist in the solution, so that a polymer chain can be formed in which the crosslinked structure and the linear chain structure are uniformly combined together. Therefore, with high mechanical strength due to the crosslinked structure developed, deformability (flexibility)

due to the linear chain structure is also developed, which can provide a binder excellent in strength and adhesion.

In addition, like the above case where the binder contains no tetracarboxylic dianhydride, also when a mixture of a hexavalent or higher-valent carboxylic anhydride, a diamine, and a tetracarboxylic dianhydride, which is a monomer component mixture for a polyimide resin including a crosslinked structure and a linear chain structure, is used as a binder precursor, the binder precursor is likely to enter between asperities on the surfaces of the negative-electrode active material particles and between asperities on the surfaces of the negative-electrode current collector during production of the negative electrode. Thus, the anchoring effect between the negative-electrode active material particles and the binder and the anchoring effect between the negative-electrode current collector and the binder are largely developed, so that the binder can achieve higher adhesion.

Diamines that can be used for the binder precursor in this case are those exemplified previously herein.

In the method for manufacturing a lithium secondary battery of the present invention, when the binder precursor solution contains not only a hexavalent or higher-valent carboxylic anhydride and a diamine but also a tetracarboxylic dianhydride, the ratio between the total amount of substance of the hexavalent or higher-valent carboxylic anhydride and the total amount of substance of the tetracarboxylic dianhydride is preferably 5:95 to 15:85.

If the amount of the hexavalent or higher-valent carboxylic anhydride is increased above a ratio of 15:85 (polycarboxylic anhydride to tetracarboxylic dianhydride), the crosslinked structure is too much, which may excessively decrease the flexibility of the whole binder. Thus, the adhesion between the negative-electrode mixture layer and the negative-electrode current collector may be reduced to degrade the charge-discharge cycle characteristic.

If the ratio between the total amount of substance of the hexavalent or higher-valent carboxylic anhydride and the total amount of substance of the tetracarboxylic dianhydride is within the above range, this provides an appropriate proportion between the crosslinked structure formed by a polymerization reaction of the hexavalent or higher-valent carboxylic anhydride and the diamine and a subsequent imidization reaction of them and the linear chain structure formed by a polymerization reaction of the diamine and the tetracarboxylic dianhydride and a subsequent imidization reaction of them. Thus, the polyimide resin can strike a balance between high mechanical strength due to the crosslinked structure and deformability (flexibility) due to the linear chain structure to provide a binder excellent in strength and adhesion.

In the method for manufacturing a lithium secondary battery of the present invention, the ratio between the total amount of substance of carboxylic groups and the total amount of substance of amine groups in the binder precursor solution is preferably 1.9 to 2.1. This ratio between the total amount of substance of carboxylic groups and the total amount of substance of amine groups can be expressed, for example, by $(6A+4C)/(2B+3D)$ where A is the total amount of substance of a hexavalent carboxylic acid component, B is the total amount of substance of a diamine component, C is the total amount of substance of a tetracarboxylic dianhydride component, and D is the total amount of substance of a trivalent amine component.

If the ratio between the total amount of substance of carboxylic groups and the total amount of substance of amine groups is 2, this is a stoichiometric proportion between them in the imidization reaction. Therefore, if the ratio between the total amount of substance of carboxylic groups and the total amount of substance of amine groups in the binder solution is near 2, or within the range of 1.9 to 2.1, a polymerization reaction of a carboxylic acid component and an amine component and a subsequent imidization reaction of them can effectively occur to provide a polyimide resin having a long polymer chain and excellent mechanical strength.

In the manufacturing method of the present invention, the negative-electrode mixture slurry is applied on the current collector and then subjected to a heat treatment in a non-oxidizing atmosphere to cause a polymerization reaction and an imidization reaction between monomer components for a polyimide resin including a crosslinked structure, resulting in the formation of a binder of the polyimide resin including a crosslinked structure.

The temperature of the heat treatment in a non-oxidizing atmosphere is preferably within a range of temperatures below the temperature at which the polyimide resin including a crosslinked structure reaches a 5% mass loss. If the temperature of the heat treatment is above the temperature at which the polyimide resin reaches a 5% mass loss, the polyimide resin may be thermally decomposed during the heat treatment, resulting in failure in the formation of a desired polyimide resin.

Furthermore, if the polyimide resin including a crosslinked structure has a glass transition temperature, the temperature during the heat treatment is preferably above the glass transition temperature. When the heat treatment is performed at a temperature above the glass transition temperature, a polyimide resin including a crosslinked structure is first formed by a polymerization reaction of the binder precursor and a subsequent imidization reaction thereof and then falls within a plastic region. This further increases the entrance of the resin between asperities existing on the surfaces of the negative-electrode active material particles and the surfaces of the negative-electrode current collector to more largely develop the anchoring effect (develop the thermal fusion bonding effect of the resin), resulting in greater adhesion.

The specific temperature of the heat treatment is, for example, preferably within the range of 200° C. to 500° C. and more preferably within the range of 300° C. to 450° C.

Examples of the non-oxidizing atmosphere include an atmosphere of inert gas, such as argon, and a nitrogen atmosphere. Alternatively, the non-oxidizing atmosphere may be a reducing atmosphere, such as hydrogen gas.

In the present invention, no particular limitation is placed on the material for the negative-electrode current collector so long as it has electrical conductivity. The negative-electrode current collector can be composed of electrically conductive metal foil, e.g., foil made of copper, nickel, iron, titanium, cobalt, manganese, tin or silicon or foil made of an alloy of a combination of these metals. Particularly, the electrically conductive metal foil is preferably copper thin film or foil made of a copper-containing alloy because it preferably should contain a metal element likely to be dispersed into active material particles.

No particular limitation is placed on the thickness of the negative-electrode current collector but, for example, it can be about 10 μm to about 100 μm.

The negative-electrode active material particles contained together with the binder in the negative-electrode mixture layer should contain at least one of silicon and a silicon-containing alloy. No particular limitation is placed on the kind of the silicon alloy so long as it is an alloy functioning as a negative-electrode active material.

Specific examples of the silicon alloy include solid solutions of silicon and one or more other elements, intermetallics of silicon and one or more other elements, and eutectic alloys of silicon and one or more other elements. Examples of the method for producing the silicon-containing alloy include arc melting, liquid quenching, mechanical alloying, sputtering, chemical vapor deposition, and firing. Specific examples of liquid quenching include single-roll quenching, twin-roll quenching, and various atomization processes, such as gas atomization, water atomization, and disk atomization.

The negative-electrode active material particles may be particles of silicon and/or a silicon alloy in which the particle surface is coated such as with metal or alloy. Examples of the coating method include non-electrolytic plating, electrolytic plating, chemical reduction, evaporation technique, sputtering, and chemical vapor deposition. The metal coating the particle surface is preferably the same metal as the electrically conductive metal foil forming the negative-electrode current collector and electrically conductive metal powder to be described below. When the particles are coated with the same metal as the electrically conductive metal foil and the electrically conductive metal powder, the binding property of the particles with the current collector and the electrically conductive metal powder during sintering can be significantly improved to give a more excellent charge-discharge cycle characteristic.

No particular limitation is placed on the average particle diameter of the negative-electrode active material particles but it is, for example, preferably not greater than 100 μm and more preferably not greater than 50 μm.

In the present invention, the negative-electrode mixture layer may further contain electrically conductive powder, such as electrically conductive metal powder or electrically conductive carbon powder. A specific example of the preferred electrically conductive metal powder that can be used is one made of the same material as the electrically conductive metal foil. Specifically, the preferred electrically conductive metal powder that can be used is powder formed of a metal, such as copper, nickel, iron, titanium or cobalt, or an alloy of a combination of these metals. No particular limitation is placed on the average particle diameter of the electrically conductive powder but it is preferably not greater than 100 μm and more preferably not greater than 50 μm.

In the present invention, no particular limitation is placed on the materials for the positive electrode and the nonaqueous electrolyte and, for example, known materials can be used.

The positive electrode generally includes a positive-electrode current collector composed such as of electrically conductive metal foil; and a positive-electrode mixture layer formed on the positive-electrode current collector. The positive-electrode mixture layer contains a positive-electrode active material. No particular limitation is placed on the positive-electrode active material, so long as lithium can be electrochemically inserted into and extracted from it. Specific examples of the positive-electrode active material include lithium-containing transition metal oxides, such as $LiCoO_2$, $LiNiO_2$, $LiMn_2O_4$, $LiMnO_2$, $LiCo_{0.5}Ni_{0.5}O_2$, and $LiNi_{0.7}Co_{0.2}Mn_{0.1}O_2$; and metal oxides containing no lithium, such as $MnO_2$.

No particular limitation is also placed on the solvent for use in the nonaqueous electrolyte. Specific examples of the solvent for use in the nonaqueous electrolyte include cyclic carbonates, such as ethylene carbonate, propylene carbonate, butylene carbonate, and fluoroethylene carbonate; chain carbonates, such as dimethyl carbonate, methyl ethyl carbonate, and diethyl carbonate; and mixture solvents of a cyclic carbonate and a chain carbonate.

No particular limitation is also placed on the solute for use in the nonaqueous electrolyte. Specific examples of the solute for use in the nonaqueous electrolyte include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, and mixtures of them. Usable electrolytes include gel polymer electrolytes in which a polymer electrolyte, such as polyethylene oxide or polyacrylonitrile, is impregnated with an electrolytic solution, and inorganic solid electrolytes, such as LiI and $Li_3N$. Furthermore, the nonaqueous electrolyte preferably contains $CO_2$.

EXAMPLES

Hereinafter, the present invention will be described in more detail with reference to specific examples. However, the present invention is not at all limited by the following examples, and can be embodied in various other forms appropriately modified without changing the spirit of the invention.

Example 1

<Production of Negative Electrode>
[Preparation of Negative-Electrode Active Material]

First, fine polycrystalline silicon particles were introduced into a fluidized bed having an internal temperature of 800° C. and monosilane ($SiH_4$) was fed into it to prepare particulate polycrystalline silicon.

Next, this particulate polycrystalline silicon was ground with a jet mill and the ground polycrystalline silicon particles were then classified by a classifier to prepare polycrystalline silicon powder (a negative electrode active material) having a median diameter of 9 μm. The median diameter was determined from the diameter at 50% cumulative volume in a particle size distribution measurement made by laser diffractometry.

The crystallite size of this polycrystalline silicon powder was 44 nm from the calculation of Scherrer equation using the peak half-width of the silicon (111) plane obtained by powder X-ray diffractometry.

[Preparation of Negative-Electrode Binder Precursor]

A product obtained by esterifying benzenehexacarboxylic trianhydride represented by Chem. 1 above with 3 equivalent of ethanol, a product obtained by esterifying 3',4,4'-benzophenonetetracarboxylic dianhydride represented by Chem. 4 above with 2 equivalent of ethanol, and m-phenylenediamine represented by Chem. 2 above were dissolved in N-methyl-2-pyrrolidone (NMP) to give a Chem. 1 to Chem. 4 to Chem. 2 mole ratio of 5:95:102.5, thereby obtaining a binder precursor solution a1.

Where the amount of substance of Chem. 1 in the binder precursor solutional, the amount of substance of Chem. 4 in the same, and the amount of substance of Chem. 2 in the same are represented by A, B, and c, respectively, (6A+4B)/2c=2 holds.

[Preparation of Negative-Electrode Mixture Slurry]

The prepared negative-electrode active material, graphite powder having an average particle diameter of 3 μm as a negative-electrode electronic conductor, and the prepared negative-electrode binder precursor solutional were mixed together so that the mass ratio of the negative-electrode active material powder to the negative-electrode electronic conductor powder to the negative electrode binder (binder subjected to NMP removal by drying the negative-electrode binder precursor solutional, a polymerization reaction, and an imidization reaction) was 89.5:3.7:6.8, resulting in preparation of a negative-electrode mixture slurry.

[Production of Negative Electrode]

The prepared negative-electrode mixture slurry was applied onto both sides of the negative-electrode current collector in air at 25° C., then dried in air at 120° C., and then rolled in air at 25° C. The resultant product was cut out in a rectangular shape 380 mm long by 52 mm wide, and the cut piece was subjected to a heat treatment in an argon atmosphere at 400° C. for 10 hours to produce a negative electrode in which a pair of negative-electrode active material layers were formed on both surfaces of the negative-electrode current collector. A nickel plate serving as a negative-electrode current collector tab was connected to an end of the negative electrode. The amount of negative-electrode mixture layer on the negative-electrode current collector was 5.6 mg/cm$^2$ and the thickness was 56 μm. The negative-electrode current collector used was one obtained by roughening both sides of 18 μm thick copper alloy foil (C7025 alloy foil, composition: 96.2% by mass Cu, 3% by mass Ni, 0.65% by mass Si, and 0.15% by mass Mg) by electrolytic copper plating to have a surface roughness Ra (JIS B 0601-1994) of 0.25 μm and an average peak-to-peak distance S (JIS B 0601-1994) of 0.85 μm.

In order to confirm that a polyimide compound was produced from the binder precursor solution a1 by the above heat treatment to the negative electrode, the following experiment was conducted. The binder precursor solution a1 was dried in air at 120° C. to remove NMP and then subjected to a heat treatment in an argon atmosphere at 400° C. for 10 hours in the same manner as in the foregoing heat treatment to the negative electrode, and the resultant product was measured in terms of infrared (IR) absorption spectrum. As a result, a peak from an imide bond was observed in the vicinity of 1720 cm$^{-1}$. Thus, it was confirmed that because of the heat treatment to the binder precursor solution a1, the polymerization reaction and the imidization reaction progressed to produce a polyimide compound.

<Production of Positive Electrode>

[Preparation of Lithium-Transition Metal Composite Oxide]

Positive-electrode active materials $Li_2CO_3$ and $CoCO_3$ were mixed in a mortar to given a Li to Co mole ratio of 1:1, and the mixture was subjected to a heat treatment in an air atmosphere at 800° C. for 24 hours and then ground to obtain positive-electrode active material powder of a lithium-cobalt composite oxide represented as $LiCoO_2$ and having an average particle diameter of 10 μm. The resultant positive-electrode active material powder had a BET specific surface area of 0.37 m$^2$/g.

[Production of Positive Electrode]

The above prepared $LiCoO_2$ powder as a positive-electrode active material, carbon material powder as a positive-electrode electronic conductor, and poly(vinylidene fluoride) as a positive electrode binder were added to NMP as a dispersion medium to give a positive-electrode active material to electronic conductor to binder mass ratio of 95:2.5:2.5 and then kneaded to prepare a positive-electrode mixture slurry.

The positive-electrode mixture slurry was applied onto both sides of a 15 μm thick, 402 mm long and 50 mm wide piece of aluminum foil serving as a positive-electrode current collector, dried, and then rolled. The positive-electrode mixture slurry was applied so that a portion thereof applied to the front side of the positive-electrode current collector was 340 mm long and 50 mm wide and a portion thereof applied to the back side of the positive-electrode current collector was 270 mm long and 50 mm wide. The amount of active material on the current collector and the thickness of the positive electrode were 48 mg/cm$^2$ and 143 μm, respectively, in the portion of the current collector in which a pair of active material layers were formed on both sides.

An aluminum plate was connected as a positive-electrode current collector tab to a portion of the positive electrode which was located at an end of the positive electrode and on which the positive-electrode active material layers were not applied.

[Preparation of Nonaqueous Electrolytic Solution]

In an argon atmosphere, lithium hexafluorophosphate ($LiPF_6$) was dissolved in a mixed solvent containing fluoroethylene carbonate (FEC) and methyl ethyl carbonate (MEC) in a volume ratio of 2:8 to reach a concentration of 1 mol/L, and 0.4% by mass carbon dioxide gas was then dissolved in the solution to prepare a nonaqueous electrolytic solution.

[Production of Electrode Assembly]

Figure 3:
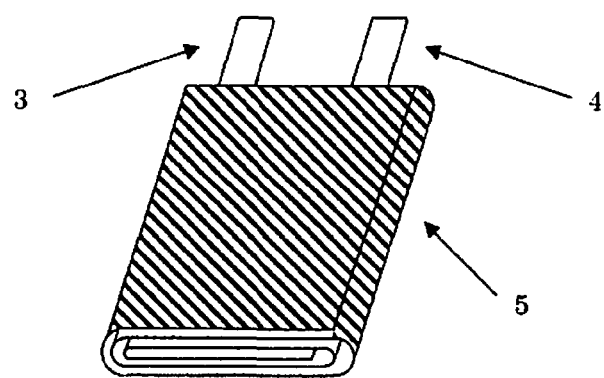
FIG. 3 is a perspective view showing an electrode assembly produced in the example of the present invention.

A single sheet of the above positive electrode, a single sheet of the above negative electrode, and two sheets of separator made of microporous polyethylene membrane were used. The separator had a thickness of 20 μm, a length of 450 mm, a width of 54.5 mm, a puncture strength of 340 g, and a porosity of 39%. The positive electrode, the negative electrode, and the separators were spirally wound up, one separator interposed between each pair of opposed surfaces of both the electrodes, on a columnar winding core so that both the positive-electrode tab and the negative-electrode tab were located at the outermost turn, the winding core was then pulled out to produce a spirally wound electrode assembly, and the electrode assembly was pressed down to form a flat electrode assembly. FIG. 3 shows a schematic view of the structure of the produced spirally wound electrode assembly.

As shown in FIG. 3, the electrode assembly 5 includes a positive-electrode current collector tab 3 and a negative-electrode current collector tab 4 both of which are extended out of the electrode assembly 5.

<Production of Lithium Secondary Battery>

The electrode assembly and electrolytic solution obtained as stated above were put into an outer casing made of aluminum laminate in a carbon dioxide atmosphere at 25° C. and at 1 atmospheric pressure to produce a flat lithium secondary battery.

FIG. 1 is a plan view showing the produced lithium secondary battery. As shown in FIG. 1, the lithium secondary battery is composed of an aluminum laminate outer casing 1, a closed part 2 in which the ends of the aluminum laminates are heat-sealed, a positive-electrode current collector tab 3, a negative-electrode current collector tab 4, and an electrode assembly 5.

Figure 2:
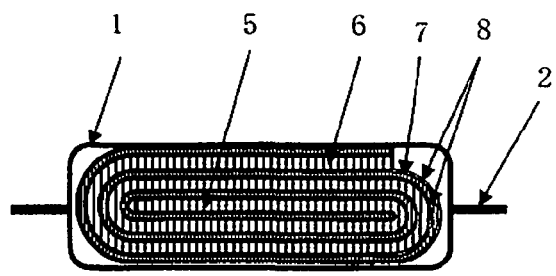
FIG. 2 is a cross-sectional view taking along the line A-A shown in FIG. 1.

FIG. 2 is a cross-sectional view taking along the line A-A shown in FIG. 1. The electrode assembly 5 is constructed by winding a positive electrode 6 and a negative electrode 7 with one separator 8 sandwiched between each pair of adjacent surfaces of the positive electrode 6 and the negative electrode 7.

In the above manner, an inventive battery A1 was produced.

Example 2

An inventive battery A2 was produced in the same manner as in the inventive battery A1 except that in preparing a negative-electrode binder precursor, the Chem. 1 to Chem. 4 to Chem. 2 mole ratio was 15:85:107.5.

Example 3

An inventive battery A3 was produced in the same manner as in the inventive battery A1 except that in preparing a negative-electrode binder precursor, the Chem. 1 to Chem. 4 to Chem. 2 mole ratio was 20:80:110.

Example 4

An inventive battery A4 was produced in the same manner as in the inventive battery A1 except that in preparing a negative-electrode binder precursor, 3,3',4,4'-biphenyltetracarboxylic dianhydride represented by Chem. 5 above was used in place of 3,3',4,4'-benzophenonetetracarboxylic dianhydride represented by Chem. 4 above.

Example 5

An inventive battery A5 was produced in the same manner as in the inventive battery A1 except that in preparing a negative-electrode binder precursor, tris(4-aminophenyl)methanol represented by Chem. 8 below was further added as a multivalent amine so that the Chem. 1 to Chem. 4 to Chem. 2 to Chem. 8 mole ratio was 5:95:95:5.

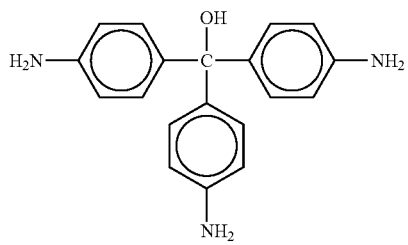

[Chem. 8]

Comparative Example 1

A comparative battery B1 was produced in the same manner as in the inventive battery A1 except that in preparing a negative-electrode binder precursor, the product obtained by esterifying benzenehexacarboxylic trianhydride represented by Chem. 1 above with 3 equivalent of ethanol was not mixed and the Chem. 4 to Chem. 2 mole ratio was 100:100.

Comparative Example 2

A comparative battery B2 was produced in the same manner as in the inventive battery A4 except that in preparing a negative-electrode binder precursor, the product obtained by esterifying benzenehexacarboxylic trianhydride represented by Chem. 1 above with 3 equivalent of ethanol was not mixed and the Chem. 5 to Chem. 2 mole ratio was 100:100.

[Evaluation of Charge-Discharge Cycle Characteristic]

The above inventive batteries A1-A5 and comparative batteries B1-B2 were evaluated for charge-discharge cycle characteristic under the following charge-discharge cycle conditions.

(Charge-Discharge Cycle Conditions)
Charge Conditions in First Cycle

Each battery was charged at a constant current of 50 mA for 4 hours, then charged at a constant current of 200 mA to a battery voltage of 4.2 V, and then further charged at a constant voltage of 4.2 V to a current value of 50 mA.

Discharge Conditions in First Cycle

Each battery was discharged at a constant current of 200 mA to a battery voltage of 2.75 V.

Charge Conditions in Second and Subsequent Cycles

Each battery was charged at a constant current of 1000 mA to a battery voltage of 4.2 V and then further charged at a constant voltage of 4.2 V to a current value of 50 mA.

Discharge Conditions in Second and Subsequent Cycles

Each battery was discharged at a constant current of 1000 mA to a battery voltage of 2.75 V.

The initial charge/discharge efficiency and the cycle life were determined based on the following calculation methods.

Initial charge/discharge efficiency: {(1st cycle discharge capacity)/(1st cycle charge capacity)}×100, and Cycle life: The number of cycles when the capacity retention (value obtained by dividing the n-th cycle discharge capacity by the first cycle discharge capacity) reaches 85%.

The initial charge/discharge efficiencies and cycle lives of the inventive batteries A1-A5 and comparative batteries B1-B2 are shown in Table 1.

TABLE 1

| | Negative Electrode Binder | | | | | | | | Charge-Discharge Cycle Characteristic | |
| --- | --- | --- | --- | --- | --- | --- | --- | --- | --- | --- | --- |
| | Polycarboxylic Anhydride | | Tetracarboxylic Dianhydride | | Diamine | | Multivalent Amine | | Acid Component/ Amine Component | Initital Charge/ Discharge Efficiency | Cycle Life |
| Battery | Structure | Mole Ratio | Structure | Mole Ratio | Structure | Mole Ratio | Structure | Mole Ratio | | | |
| Inventive Battery A1 | Chem. 1 | 5 | Chem. 4 | 95 | Chem. 2 | 102.5 | — | 0 | 1 | 88 | 101 |
| Inventive Battery A2 | Chem. 1 | 15 | Chem. 4 | 85 | Chem. 2 | 107.5 | — | 0 | 1 | 88 | 104 |
| Inventive Battery A3 | Chem. 1 | 20 | Chem. 4 | 80 | Chem. 2 | 110 | — | 0 | 1 | 87 | 89 |
| Inventive Battery A4 | Chem. 1 | 5 | Chem. 5 | 95 | Chem. 2 | 102.5 | — | 0 | 1 | 87 | 98 |
| Inventive Battery A5 | Chem. 1 | 5 | Chem. 4 | 95 | Chem. 2 | 95 | Chem. 8 | 5 | 1 | 89 | 107 |
| Comparative Battery B1 | — | 0 | Chem. 4 | 100 | Chem. 2 | 100 | — | 0 | 1 | 87 | 78 |
| Comparative Battery B2 | — | 0 | Chem. 5 | 100 | Chem. 2 | 100 | — | 0 | 1 | 86 | 76 |

As is obvious from Table 1, it can be seen that the inventive batteries A1-A5 in which the negative electrode binder is a polyimide resin including a crosslinked structure formed by imidization of a hexavalent or higher-valent carboxylic acid with a diamine exhibit more excellent cycle lives than the comparative batteries B1-B2 in which the negative electrode binder is a polyimide resin not including such a crosslinked structure.

The reason for this can be attributed to the fact that the polyimide resin including the crosslinked structure developed high current collecting performance in the negative electrode because the crosslinked structure satisfied both of high mechanical strength and high adhesion.

Furthermore, a comparison among the inventive batteries A1-A5 shows that the inventive batteries A1, A2, A4, and A5 in which the ratio of the hexavalent or higher-valent carboxylic acid forming a crosslinked structure to the tetracarboxylic acid forming a linear chain structure is 5:95 to 15:85 exhibit particularly excellent cycle lives.

A comparison between the inventive batteries A1 and A5 shows that the inventive battery A5 containing as amine components not only a diamine but also a triamine which is a trivalent or higher-valent amine exhibits a particularly excellent cycle life.

Moreover, a comparison between the inventive batteries A1 and A4 shows that the tetracarboxylic dianhydride represented by Chem. 4 should be more preferably used than that represented by Chem. 5.

REFERENCE SIGNS LIST

1 ... aluminum laminate outer casing
2 ... closed part
3 ... positive-electrode current collector tab
4 ... negative-electrode current collector tab
5 ... electrode assembly
6 ... positive electrode
7 ... negative electrode
8 ... separator

The invention claimed is:

1. A lithium secondary battery including: a negative electrode in which a negative-electrode active material layer including negative-electrode active material particles containing silicon and/or a silicon alloy and a binder is formed on a surface of electrically conductive metal foil serving as a negative-electrode current collector; a positive electrode; and a nonaqueous electrolyte,
wherein the binder comprises a polyimide resin comprising a crosslinked structure formed by imidization of an anhydride represented by Chem. 1 below with a diamine represented by Chem. 2 below;
wherein the crosslinked structure comprises a structure represented by Chem. 3 below;

[Chem. 1]
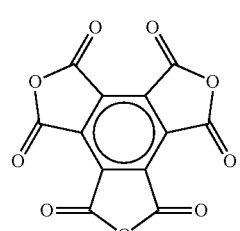

[Chem. 2]
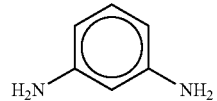

[Chem. 3]
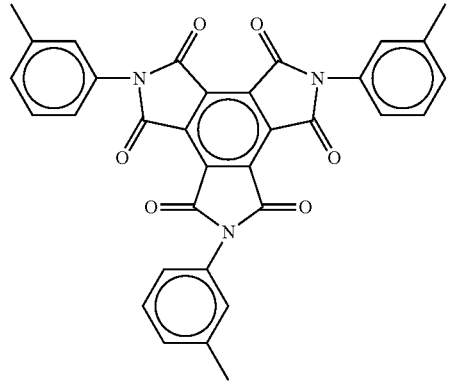

and
wherein the polyimide resin comprising the crosslinked structure comprises a linear chain structure represented by Chem. 6 below and/or Chem. 7 below and formed by imidization of a tetracarboxylic dianhydride represented by Chem. 4 below and/or Chem. 5 below with the diamine represented by Chem. 2 above:

[Chem. 4]
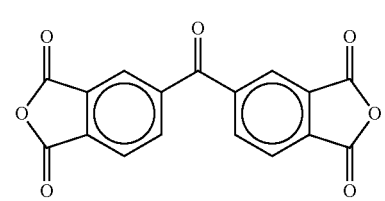

[Chem. 5]
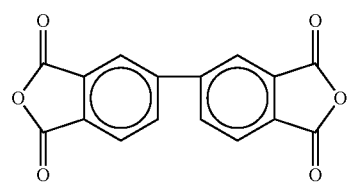

[Chem. 6]
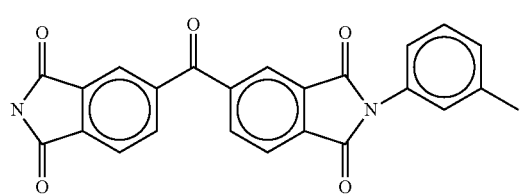

[Chem. 7]
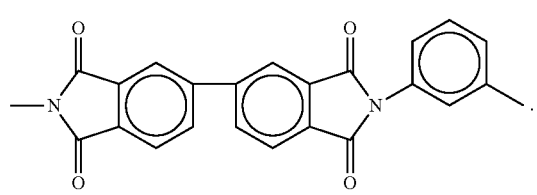

2. The lithium secondary battery according to claim 1, wherein in the polyimide resin, the ratio between the total amount of substance of the crosslinked structure represented by Chem. 3 above and the total amount of substance of the linear chain structure represented by Chem. 6 above and/or Chem. 7 above (crosslinked structure to linear chain structure) is 5:95 to 15:85.

3. The lithium secondary battery according to claim 1, wherein the polyimide resin further comprises a crosslinked structure formed by imidization of a trivalent or higher-valent amine.

4. A lithium secondary battery including: a negative electrode in which a negative-electrode active material layer including negative-electrode active material particles containing silicon and/or a silicon alloy and a binder is formed on a surface of electrically conductive metal foil serving as a negative-electrode current collector; a positive electrode; and a nonaqueous electrolyte, wherein
the binder comprises a polyimide resin which comprises a crosslinked structure and comprises a linear chain structure, where the linear chain structure is formed by imidization of a tetracarboxylic acid or a dianhydride thereof with a diamine, wherein
the crosslinked structure is formed by imidization of an anhydride of a hexavalent or higher valent carboxy acid with a diamine, wherein the anhydride of the hexavalent or higher-valent carboxylic acid comprises an anhydride represented by Chem. 1 below, the diamine comprises a diamine represented by Chem. 2 below, and the crosslinked structure comprises a structure represented by Chem. 3 below

[Chem. 1]

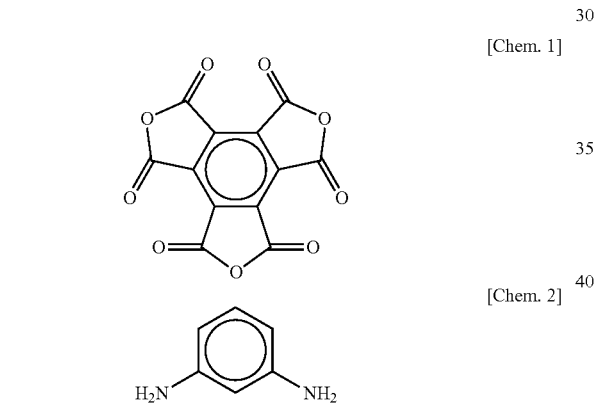

[Chem. 2]

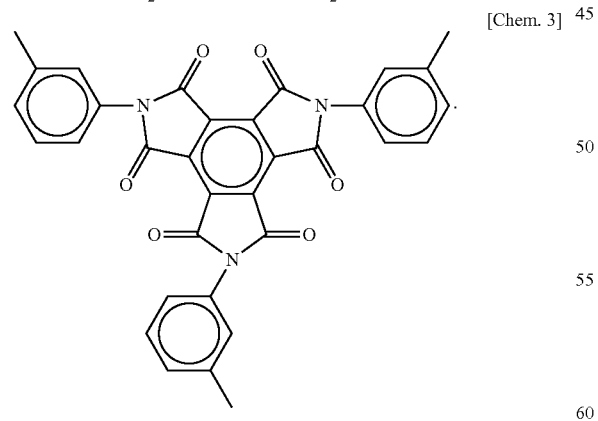

[Chem. 3]

5. The lithium secondary battery according to claim 4, wherein the polyimide resin further includes a crosslinked structure formed by imidization of a trivalent or higher-valent amine.

6. A lithium secondary battery including: a negative electrode in which a negative-electrode active material layer including negative-electrode active material particles containing silicon and/or a silicon alloy and a binder is formed on a surface of electrically conductive metal foil serving as a negative-electrode current collector; a positive electrode; and a nonaqueous electrolyte, wherein
the binder comprises a polyimide resin comprising a crosslinked structure formed by imidization of an anhydride represented by Chem. 1 below with a m-phenylenediamine, and
the anhydride of the hexavalent or higher-valent carboxylic acid comprises an anhydride represented by Chem. 1 below, and the crosslinked structure comprises a structure represented by Chem. 3 below and
wherein the polyimide resin comprising the crosslinked structure comprises a linear chain structure represented by Chem. 6 below and/or Chem. 7 below and formed by imidization of a tetracarboxylic dianhydride represented by Chem. 4 below and/or Chem. 5 below:

[Chem. 1]

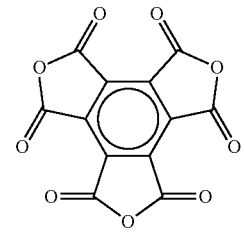

[Chem. 3]

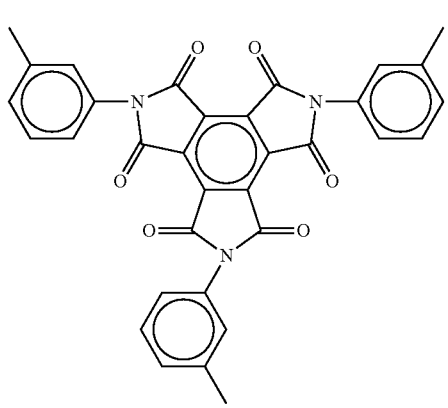

[Chem. 4]

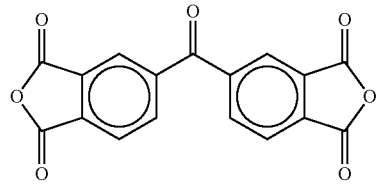

[Chem. 5]

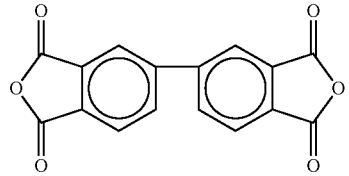

-continued

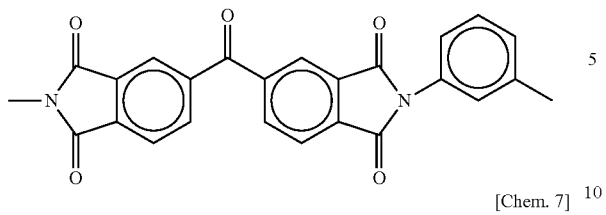
[Chem. 6]

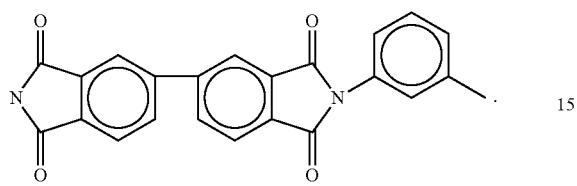
[Chem. 7]

7. The lithium secondary battery according to claim 6, wherein in the polyimide resin, the ratio between the total amount of substance of the crosslinked structure represented by Chem. 3 above and the total amount of substance of the linear chain structure represented by Chem. 6 above and/or Chem. 7 above (crosslinked structure to linear chain structure) is 5:95 to 15:85.

8. The lithium secondary battery according to claim 6, wherein the polyimide resin further comprising a crosslinked structure formed by imidization of a trivalent or higher-valent amine.

* * * * *